United States Patent
Cornett et al.

(10) Patent No.: US 9,140,798 B2
(45) Date of Patent: Sep. 22, 2015

(54) TRANSMITTING POSITIONS OF DEVICES

(71) Applicant: Honeywell International Inc., Morristown, NJ (US)

(72) Inventors: Alan Cornett, Andover, MN (US); Robert C. Becker, Golden Valley, MN (US); Glen Backes, Maple Grove, MN (US); Conrad Ihla, Zimmerman, MN (US)

(73) Assignee: Honeywell International Inc., Morristown, NJ (US)

( * ) Notice: Subject to any disclaimer, the term of this patent is extended or adjusted under 35 U.S.C. 154(b) by 381 days.

(21) Appl. No.: 13/648,867

(22) Filed: Oct. 10, 2012

(65) Prior Publication Data

US 2014/0097982 A1    Apr. 10, 2014

(51) Int. Cl.
*G01S 19/17*    (2010.01)
*G01S 5/00*    (2006.01)

(52) U.S. Cl.
CPC .............. *G01S 19/17* (2013.01); *G01S 5/0072* (2013.01)

(58) Field of Classification Search
CPC ............................ G01S 5/0027; G01S 5/0072
USPC ............... 342/357.21, 357.25, 357.4, 357.55, 342/457, 463; 701/468, 469
See application file for complete search history.

(56) References Cited

U.S. PATENT DOCUMENTS

2007/0279282 A1* 12/2007 Chang ...................... 342/357.06
2011/0207476 A1*  8/2011 Qahwash et al. .......... 455/456.2

FOREIGN PATENT DOCUMENTS

EP        1892539 A1 *  2/2008

* cited by examiner

*Primary Examiner* — Dao Phan
(74) *Attorney, Agent, or Firm* — Brooks, Cameron & Huebsch, PLLC

(57) ABSTRACT

Transmitting positions of devices is described herein. One method for transmitting a position of a device includes converting a received Global Positioning System (GPS) signal to a short range signal with a first device, transmitting the short range signal using the first device, receiving the short range signal with a second device, and transmitting a position of the second device determined from the short range signal using the second device.

20 Claims, 4 Drawing Sheets

TRANSMITTING POSITIONS OF DEVICES

TECHNICAL FIELD

The present disclosure relates to methods and systems for transmitting positions of devices.

BACKGROUND

In many situations, it can be desirable to know a location of a person. For instance, in an emergency situation, the knowledge of the location of emergency responders (e.g., firefighter, police, and/or armed forced personnel) can be useful to provide further assistance to others and/or to locate a missing and/or injured emergency responder.

Equipping emergency responders with a navigation and/or locating device can allow other responders to rapidly locate team members. Such a device, typically known as a personal navigation device, can include an inertial measurement unit (IMU) along with a Global Positioning Signal (GPS) receiver to establish an initial position of a person prior to entering a location where GPS may not be available and/or may be available intermittently, and a transmitter for relaying the position of the responder to others. A personal navigation device can be GPS aided, as the GPS signal can be used to update and correct the personal navigation device's location information whenever a GPS signal is available, thereby aiding the personal navigation device in maintaining the correct location information.

As an example, a personal navigation device can assist emergency responders, such as a firefighter, that are required to enter a building to perform rescue and/or fight a fire. The GPS signal may not generally be available in the building. Prior to entering the building, a firefighter equipped with a GPS aided personal navigation device may establish the firefighter's initial position. As the firefighter traverses the building, the firefighter's location may be accurately known at all times because in the absence of a GPS signal, the IMU can track the firefighter's motion. In the course of the firefighter exploring the building, if the firefighter discovers people in need of assistance, the firefighter can call additional responders to the firefighter's location and the responders will know immediately where the firefighter is and/or how to get to the firefighter.

Without such a device, the firefighter may be required to provide a detailed description of where the firefighter is and/or how to get to the firefighter. If the firefighter is hurt, the firefighter may be unable to communicate the firefighter's location and the remainder of the firefighter's team may have to search the building to locate the firefighter, as well as any other victim.

A severe problem for devices of this type is that acquiring a GPS position fix does not take place immediately upon the GPS receiver being exposed to GPS signals. The lag between turn on and acquisition of the current position is known as "time to first fix". Depending on conditions, this delay could be as small as 10-15 seconds or as large as several minutes. When a GPS receiver is turned on, the farther the GPS receiver is from the last position, the longer it takes to acquire the current position. Because some vehicle bodies interfere with access to GPS signals for their occupants, a first responder traveling to a scene may not be able to establish his position until the first responder exits the vehicle. Without some sort of assistance, a first responder may find that it takes longer for the GPS to establish a position after exiting the vehicle than the time for the first responder to enter a building with minimal or no GPS signal availability.

DETAILED DESCRIPTION

Figure 1:
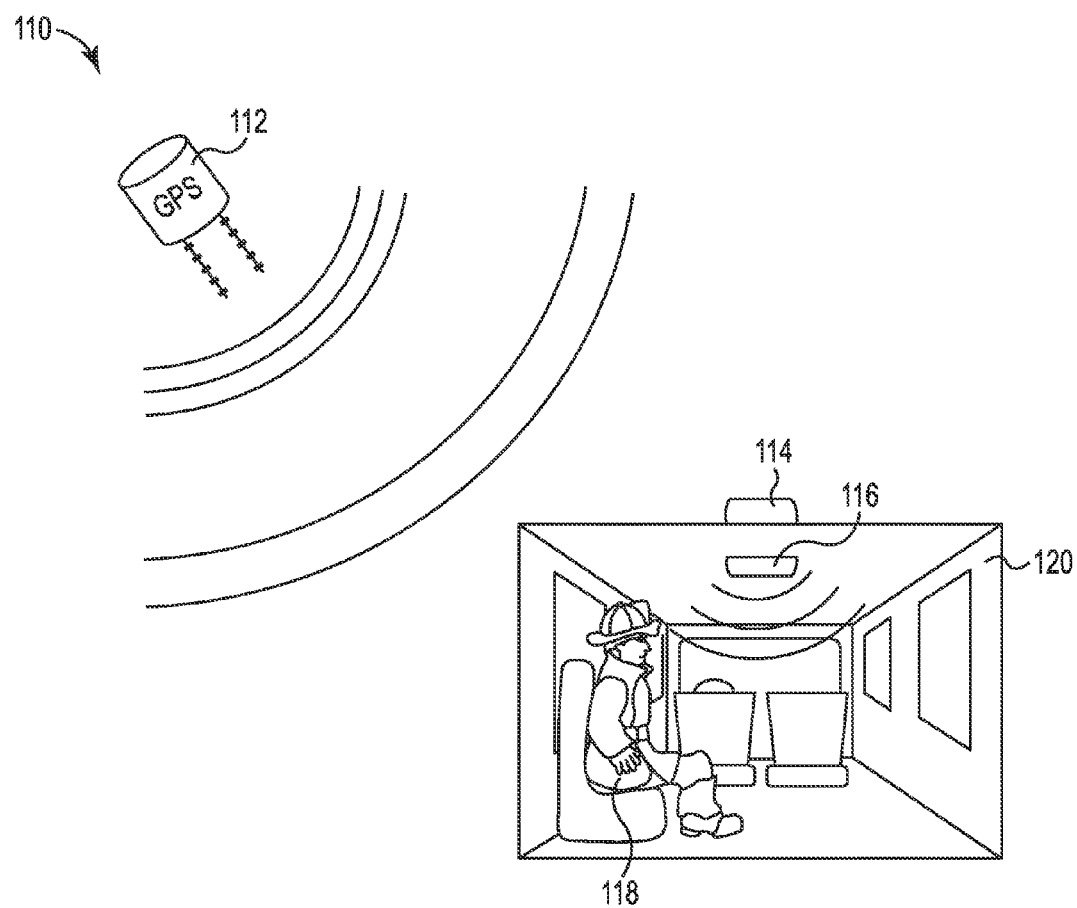
FIG. 1 illustrates an example environment for a system for transmitting a position of a device in accordance with one or more embodiments of the present disclosure.

Embodiments to the present disclosure include methods and systems for transmitting a position of a device. A position of a device, as used herein, can refer to time and/or location. Such methods and systems can be used to transmit a location of a device using a short range signal.

Transmitting a position of a device using a short range signal, in accordance with one or more embodiments of the present disclosure, can allow a position of a person to be established when a GPS signal may be unavailable and/or unreliable. Such position information can be useful in an emergency situation, as well as to locate lost and/or injured persons.

A device can be used to determine, transmit, and/or track the position of a person carrying the device. The device can be used in a navigation system and can include a mobile device, for example. In such systems, a GPS signal containing position information and/or data can be received by a GPS receiver of the mobile device to establish a position of the user. However, a person may be in a location where a GPS and/or other global navigation signal is unavailable and/or unreliable. For instance, a GPS signal may not be available in a vehicle, building, and/or underground, among other locations. If a person wearing and/or using a mobile device is in a location where GPS is unavailable and/or unreliable, the mobile device may not establish an accurate position.

As an example, a firefighter may be wearing a mobile device inside an emergency vehicle. A GPS signal may be unavailable and/or unreliable inside the emergency vehicle. Thereby, en route to a location, the position of the firefighter may not be established. The firefighter may exit the emergency vehicle and enter a building where an emergency situation is occurring before the GPS receiver can establish a position fix. Additionally, the GPS signal may be unavailable inside the building.

If the firefighter exits the emergency vehicle and enters the building prior to the mobile device establishing the position of the firefighter, the navigation information in the firefighter's mobile device may be inaccurate and/or useless. Further, given the possibility of an emergency situation, waiting outside the building for the mobile device to establish a position fix may not be practical.

In addition to tracking emergency personal, it may be beneficial to track children, employees, and/or government personal (e.g., military members while in action), among other persons. For instance, a child may be lost in a building, such as a mall, where GPS signals may be unavailable. An employee may be on location, such as a factory, and an employer may desire to locate the employee for safety and/or other work related reasons. A government personal may be located inside a vehicle, similarly to a firefighter, and due to an emergency situation the location of the government personal may be desirable. The building the child is located in, the factory the employee is in, and/or the vehicle the government personal is in may have unreliable and/or unavailable GPS signal reception. Thereby, a personal navigation device based solely on GPS can be inaccurate and/or useless.

In contrast, transmitting a position of a device in accordance with one or more embodiments of the present disclosure may include transmitting a position of a first device to a second device that performs personal navigation using a short range signal, the second device can use the position data sent from the first device to update the position of the second device. For example, one or more embodiments can include converting a received GPS signal to a short range signal with a first device, transmitting the short range signal using the first device, receiving the short range signal with a second device, and transmitting a position of the second device determined from the short range signal using the second device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 230 may reference element "30" in FIG. 2, and a similar element may be referenced as 430 in FIG. 4.

As used herein, "a" or "a number of" something can refer to one or more such things. For example, "a number of radio devices" can refer to one or more radio devices. Additionally, the designator "N" and "P" as used herein, particularly with respect to reference numerals in the drawings, indicate that a number of the particular feature so designated can be included with a number of embodiments of the present disclosure.

FIG. 1 illustrates an example environment 110 for a system for transmitting a position of a device in accordance with one or more embodiments of the present disclosure. The environment 110 can, for instance, include a person 118 located inside a location 120 where a GPS signal may be unavailable and/or unreliable without the system. Such a location 120 can include a vehicle, a building, a location underground, and/or other locations that a GPS signal cannot be received and/or may be unreliable. For example, a person 118 can include first responder personnel, an employee, a government personal, and/or a child, among other persons.

A GPS and/or other global navigation signal, as used herein, can include a signal sent from a GPS satellite 112, and/or can include location and/or position data. A GPS can include a space-based satellite navigation system that provides location and time information (e.g., position data), where there is no unobstructed line of sight to four or more GPS satellites 112.

For instance, a GPS signal may be unreliable and/or unavailable in the location 120. A GPS signal may be unreliable and/or unavailable, for example, if there is an unobstructed line of sight in the location 120 to three or less GPS satellites 112. A person 118 located inside the location 120 wearing a device, such as a personal navigation device that employs GPS aiding, may not receive position data to establish an accurate position of the person 118.

In one or more embodiments of the present disclosure, as illustrated in FIG. 1, a first device 114, 116 fixed to the location 120 can allow for position data in the GPS signal sent from the GPS satellite 112 to be received by a second device located on the person 118. Position data, as used herein, can include location and/or time information sent from a GPS system. The first device 114, 116 can convert a received GPS signal to a short range signal and/or transmit the short range signal to the second device.

Converting a received GPS signal to a short range signal can, for instance, include converting a received GPS position signal to a position message suitable for transmission as a short range signal. A GPS position signal can include a GPS signal with location and/or position data, for instance. A position message can, for example, include a signal containing the location and/or position data.

As used herein, a short range signal can include a short-wavelength Radio Frequency (RF) signal. Example short range signals can include 315 Megahertz (MHz), 433 MHz, 868 MHz, 902-928 MHz, 2.4-2.5 Gigahertz (GHz), and 5.7-5.8 GHz, among other wavelengths. For instance, a short range signal can include a Zigbee, Blue-Tooth, and/or other short range signals.

Figure 2:
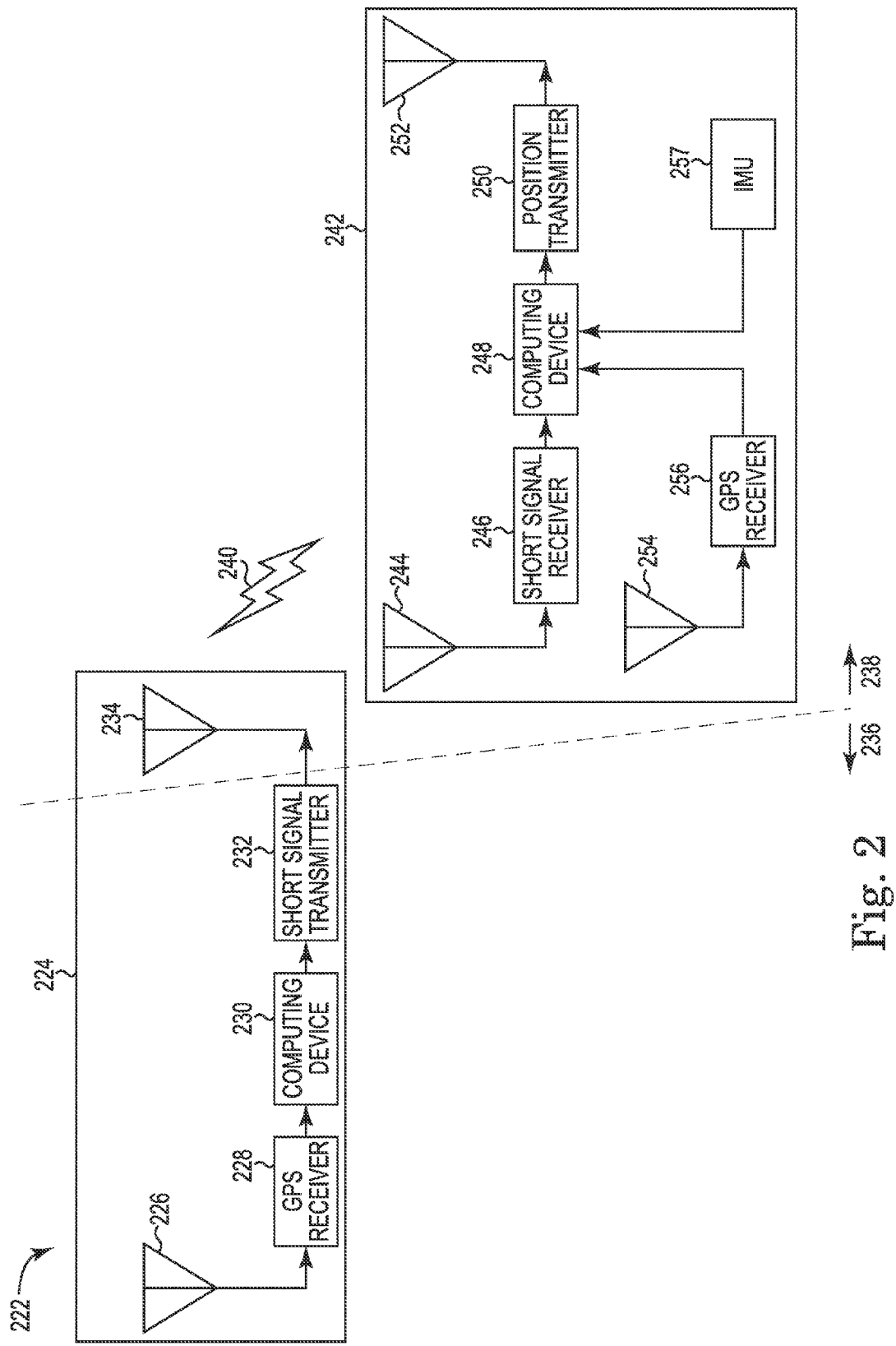
FIG. 2 illustrates an example system for transmitting a position of a device in accordance with one or more embodiments of the present disclosure.

FIG. 2 illustrates an example system 222 for transmitting a position of a device in accordance with one or more embodiments of the present disclosure. The system 222 illustrated in FIG. 2, in some embodiments, can include the system illustrated in the environment 110 illustrated in FIG. 1. The system 222 can include a first device 224 and a second device 242, for example.

A first device 224 can include a fixed device, for instance. A fixed device, as used herein, can include a device fixed and/or mounted to a location. For example, a fixed device can be mounted to a vehicle, a building, and a skyway system, among other locations.

As illustrated in the embodiment of FIG. 2, a first device 224 can include a first receiver 228, a first computing component 230, and a first transmitter 232. As used herein, a receiver can be used to receive signals. The first receiver 228 can, for instance, be a GPS receiver. A GPS receiver 228 can be used to receive GPS signals, for example. For instance, a GPS receiver 228 can be a portion of a GPS radio component 226, 228. A GPS radio component 226, 228 can include a GPS antenna 226 and the GPS receiver 228 for receiving a GPS signal including position data. An antenna can, for example, include an electrical device which can convert electric currents into radio waves, and/or vice versa. A GPS antenna 226 for receiving a GPS signal can include an antenna that can intercept a GPS signal to produce a voltage at its terminal that can be applied to the first receiver 228 to be amplified.

A first computing component 230 can, for example, include a microcontroller embedded on the first device 224. A microcontroller, as used herein, can include a computing device and/or single integrated circuit containing a processor core, memory, and/or programmable input/output peripherals. The first computing component 230 can convert the received GPS position signal to a position message (e.g., message containing position data) suitable for transmission by a first transmitter 232 (e.g., a short range signal).

A first transmitter 232 can, for instance, take the position message created by the first computing component 230 and transmit the message as a short range signal 240. A transmitter, as used herein, can be used to transmit a signal. The first transmitter 232 can generate a RF alternating current that is applied to an antenna to transmit the signal. For instance, the first transmitter 232 can be a short range transmitter (e.g. as illustrated by a short signal transmitter 232 in FIG. 2). The short range transmitter can be a portion of a first short range radio component 232, 234. A first short range radio component 232, 234 can include a short range antenna 234 and the short range transmitter 232 for transmitting the position message created by the first computing component 230. The short range antenna 234 can be used to radiate short wavelength radio waves, for example.

For instance, the first device 224 can be fixed to a location. As shown in the embodiment of FIG. 2, the first device can be located outside the location 236 and inside the location 238. For example, the GPS radio component 226, 228, the first computing component 230, and the first transmitter 232 can be located on an outer portion of the location 236. The short range antenna 234 of the first short range radio component 232, 234 can be located on an inner portion of the location 238.

The short range antenna 234 can be located on the inner portion of the location 238 through an aperture extending from the outer portion of the location 236 to the inner portion of the location 238, for example. An aperture, as used herein, can include a drilled hole and/or a barrel that extends and/or protrudes into the inner portion of the location 238. Thereby, the first short range radio component 232, 234 of the first device 224 can transmit a short range signal 240 from an outer portion of the location 236 to an inner portion of location 238. The short range antenna 234 and the short range transmitter 232 can, for example, be electrically connected through the aperture.

A second device 242 can include a mobile device, for instance. A mobile device, as used herein, can include a device that is located on a person and/or can move with the person. For example, a mobile device can include a navigation system and/or a mobile cellular telephone, among other mobile devices.

For example, as illustrated in FIG. 2, a second device 242 can include a second receiver 246, a second computing component 248, an inertial measurement unit (IMU) 257, and a second transmitter 250. The second receiver 246 can include a short range receiver (e.g. as illustrated by a short signal receiver 246 in FIG. 2), for instance. A short range receiver 246 can be a portion of a second short range radio component 244, 246. The second short range radio component 244, 246 can include a short range antenna 244 and the short range receiver 246 for receiving a converted short range signal sent and/or transmitted from the first device 224.

An IMU 257 can receive position messages (e.g., one or more messages containing position data) from a GPS receiver 256 and/or from the second receiver 246 via the second computing component 248. An IMU 257, as used herein, can include a component of the second device 242 that can measure and/or report velocity, orientation, and/or gravitational forces of the second device 242 using a combination of accelerometers and gyroscopes. For instance, the IMU 257 can detect and/or monitor acceleration and/or rotation (e.g. pitch, roll, and yaw) of the second device 242.

In the absence of position messages from the GPS receiver 256 and/or the short range receiver 246, the second computing component 248 can acquire position data from the IMU 257. As such, the IMU 257 can provide position data and/or location information when no other position data is available.

A second computing component 248 can include a microcontroller embedded on the second device 242, for example. The second computing component 248 can determine a position of the second device 242 using the position data in the converted short range signal 240 and/or from the IMU 257.

A second transmitter 250 can, for example, be used to transmit a determined position of the second device 242. A second transmitter 250 can include a position reporting transmitter (e.g. as illustrated by the position transmitter 250 in FIG. 2). For example, a second transmitter 250 can be a portion of a position reporting radio component 250, 252. A position reporting radio component 250, 252 can include the position reporting transmitter 250 and a position reporting antenna 252 for transmitting the determined position of the second device 242, for example.

The second device 242, as shown in the embodiment of FIG. 2, can be located inside of a location 238. The location 238 (e.g., the inside of the location) may not have access to a GPS signal and/or may have unreliable access to a GPS signal. Thereby, the first device 224 may be used to convert a GPS signal to a short range signal 240 to determine a position of the second device 242 located inside the location 238.

In various embodiments of the present disclosure, the second device 242 can include a GPS radio component 254, 256. As illustrated in FIG. 2, a GPS radio component 254, 256 can include a GPS antenna 254 and a GPS receiver 256. When a GPS signal is available for the second device 242, the second device 242 can receive a GPS signal using the GPS radio component 254, 256 of the second device 242 without use of the first device 224, for instance. Position data from GPS receiver 256 can, for example, be used to update the position data of and/or from the IMU 257.

In accordance with one or more embodiments of the present disclosure, the IMU 257 can receive the position data from a converted GPS signal and/or from the GPS radio component 254, 256 via the second computing component 248 of the second device 242 and update the position and/or determine a revised position of the second device 242 based on movement of the second device 242. As an example, a firefighter exploring a building can cause the IMU 257 to update the position and/or determine a revised position of the second device 242. Thereby, in various embodiments, if position data is not available from the GPS receiver 256 and/or position data is not available from the short range receiver 246, position data can be provided by the IMU 257.

In various embodiments, the IMU 257 can update the position and/or revise the position of the second device 242 without actual movement of the second device 242. This can cause the updated position and/or revised of the second device 242 determined using the IMU 257 to be inaccurate. Subsequent position data received from the GPS receiver 256 and/or the short range receiver 246 can, for instance, be used to correct an updated position and/or revised position determined using the IMU 257.

In some embodiments of the present disclosure, the second computing component 248 of the second device 242 can determine the position of the second device 242 based on a plurality of position data. The plurality of position data can include converted short range position data 240, a plurality of short range position data, GPS position data, and/or a plurality of GPS position data. The GPS position data and/or plurality of GPS position data can be received by the GPS radio component 254, 256 of the second device 242.

For instance, in various embodiments, the system 222 can include a plurality of first devices (e.g. fixed devices). The plurality of first devices can be fixed to a number of locations. The plurality of first devices can, for example, each be fixed to one or more places in a location (e.g., building, factory, and mall) and/or to a plurality of locations (e.g., plurality of buildings in a skyway system, factory, manufacturing system, and mall).

The second device 242 can, for instance, receive converted short range signals from a number of the plurality of first devices. For example, the second device can receive a short range signal from the number of the plurality of first devices when the second device 242 is within a threshold distance of the number of first devices. The threshold distance can include a range of the short wavelength of the short range signal 240.

Figure 3:
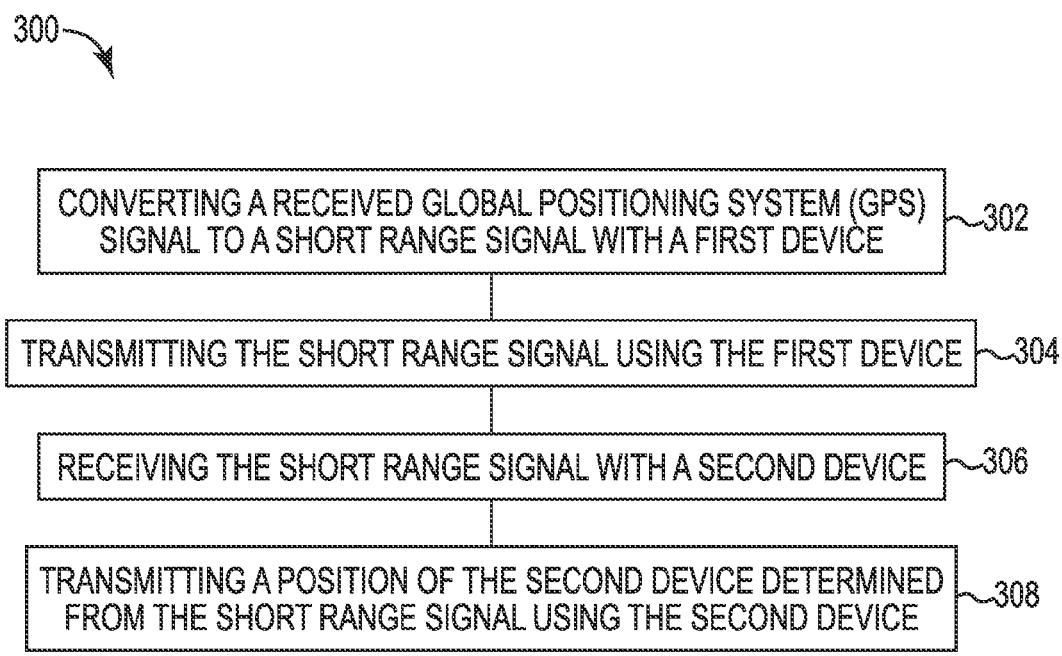
FIG. 3 illustrates a block diagram of an example of a method for transmitting a position of a device in accordance with one or more embodiments of the present disclosure.

FIG. 3 illustrates a block diagram of an example of a method 300 for transmitting a position of a device in accordance with one or more embodiments of the present disclosure. At block 302, the method 300 can include converting a received GPS signal to a short range signal with a first device. A first device can include a first computing device and/or a fixed device, for example.

At block 304, the method 300 can include transmitting the short range signal using the first device. For example, the converted short range signal can be transmitted using a short range antenna located on an inner portion of a location (e.g., inside a location). Thereby, a converted short range signal containing position data and/or GPS information can be received inside a location that does not have access to a GPS signal and/or cannot receive a GPS signal.

At block 306, the method 300 can include receiving the short range signal with a second device. The second device can include a second computing component and/or a mobile device. The second device can be located inside of a location, for instance.

At block 308, the method 300 can include transmitting a position of the second device determined from the short range signal using the second device. The position of the second device can be determined using a second computing component of the second device, for example.

In some embodiments of the present disclosure, the second computing component can determine the position of the second device based on a plurality of position data. For instance, the second computing component can determine the position using a position algorithm. The position algorithm can, for example, determine which position data among the plurality of position data is accurate and update the position of the second device based on the most accurate position data. The plurality of position data can include converted short range signals, GPS signals, IMU data, and/or any combination thereof.

Figure 4:
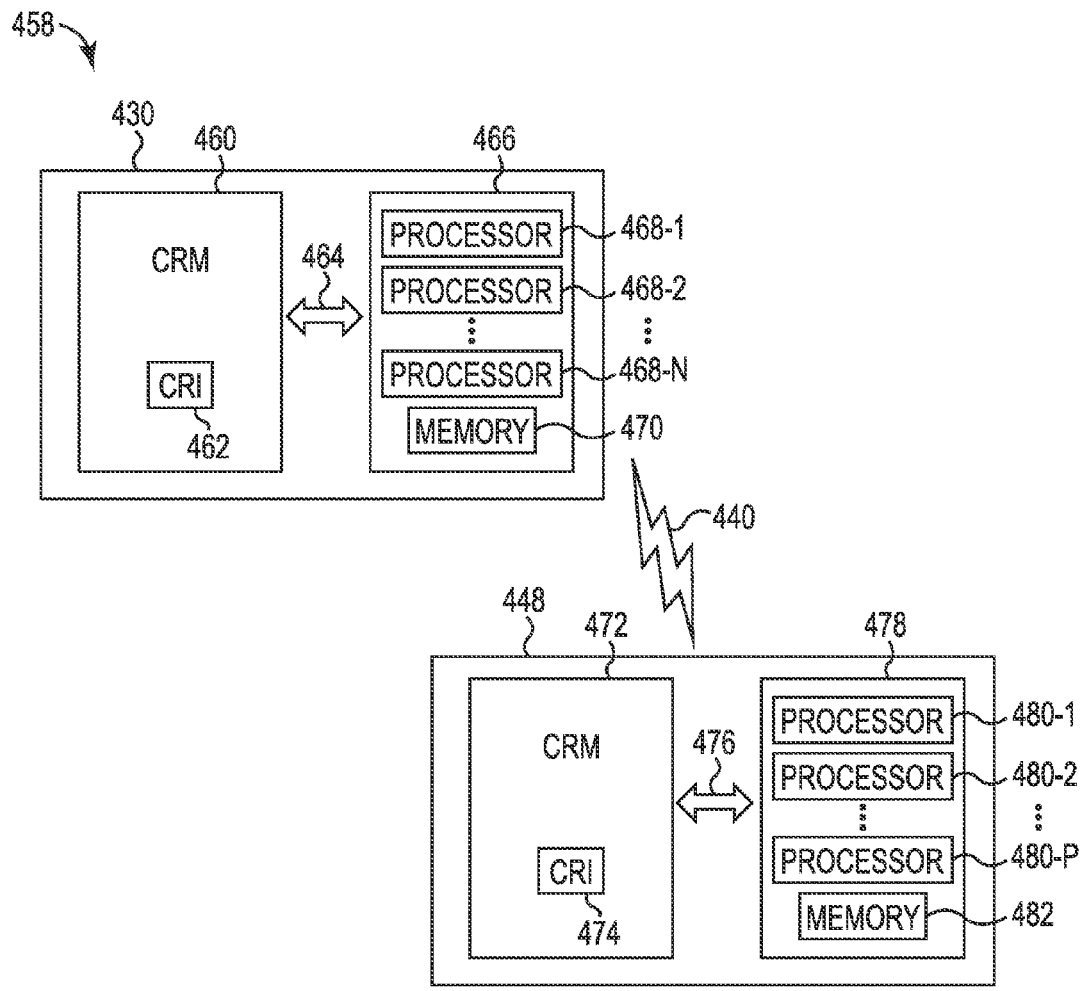
FIG. 4 illustrates an example system for transmitting a position of a device in accordance with one or more embodiments of the present disclosure.

FIG. 4 illustrates an example system 458 for transmitting a position of a device in accordance with one or more embodiments of the present disclosure. The system 458, as illustrated in FIG. 4, can include a first computing device 430 and a second computing device 448. The first computing device 430 of FIG. 4 can include the first computing component 230 illustrated in the embodiment of FIG. 2, and the second computing device 448 of FIG. 4 can include the second computing component 248 illustrated in the embodiment of FIG. 2, for example.

The first computing device 430 can include computer-readable medium (CRM) 460 in communication with processing resources (e.g., processors 468-1, 468-2 ... 468-N). CRM 460 can be in communication with a device 466 having processing resources 468-1, 468-2 ... 468-N. The device 466 can be in communication 464 with a tangible non-transitory CRM 460 storing a set of computer-readable instructions (CRI) 462 executable by one or more the processing resources 468-1, 468-2 ... 468-N, as described herein. The CRI 462 can also be stored in remote memory managed by a server and represent an installation package that can be downloaded, installed, and executed. The device 466 can include memory resources 470, and the processing resources 468-1, 468-2 ... 468-N can be coupled to the memory resources 470.

Processing resources 468-1, 468-2 ... 468-N can execute CRI 462 that can be stored on an internal or external non-transitory CRM 460. The processing resources 468-1, 468-2 ... 468-N can execute CRI 462 to perform various functions, for example, the processing resources 468-1, 468-2 ... 468-N can execute CRI 462 to convert a GPS signal to a short range signal including the position data.

The second computing device 448 can include computer-readable medium (CRM) 472 in communication with processing resources (e.g., processors 480-1, 480-2 ... 480-P). CRM 472 can be in communication with a device 478 having processing resources 480-1, 480-2 ... 480-P. The device 478 can be in communication 476 with a tangible non-transitory CRM 472 storing a set of CRI 474 executable by one or more the processing resources 480-1, 480-2 ... 480-P, as described herein. The CRI 474 can also be stored in remote memory managed by a server and represent an installation package that can be downloaded, installed, and executed. The device 478 can include memory resources 482, and the processing resources 480-1, 480-2 ... 480-P can be coupled to the memory resources 482.

Processing resources 480-1, 480-2 ... 480-P can execute CRI 474 that can be stored on an internal or external non-transitory CRM 472. The processing resources 480-1, 480-2 ... 480-P can execute CRI 474 to perform various functions, for example, the processing resources 480-1, 480-2 ... 480-P can execute CRI 474 to determine a position of the second device using the position data received in the short range signal 440.

A non-transitory CRM (e.g., CRM 460 and CRM 472), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 460, 472 can also include distributed storage media. For example, the CRM 460, 472 can be distributed among various locations.

The non-transitory CRM 460, 472 can be integral, or communicatively coupled, to a computing device, in a wired and/or a wireless manner. For example, the non-transitory CRM 460, 472 can be an internal memory, a portable memory, a portable disk, or a memory associated with another computing resource (e.g., enabling OR's to be transferred and/or executed across a network such as the Internet).

The CRM 460, 472 can be in communication with the processing resources 468-1, 468-2 ... 468-N, 480-1, 480-2 ... 480-P via a communication path 464, 476. The communication path 464, 476 can be local or remote to a machine (e.g., a computer) associated with the processing resources 468-1, 468-2 ... 468-N, 480-1, 480-2 ... 480-P. Examples of a local communication path 464, 476 can include an electronic bus internal to a machine (e.g., a computer) where the CRM 460, 472 is one of volatile, non-volatile, fixed, and/or removable storage medium in communication with the processing resources 468-1, 468-2 ... 468-N, 480-1, 480-2 ... 480-P via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication paths 464, 476 can be such that the CRM 460, 472 is remote from the processing resources e.g., 468-1, 468-2 ... 468-N, 480-1, 480-2 ... 480-P, such as in a network relationship between the CRM 460, 472 and the processing resources (e.g., 468-1, 468-2 ... 468-N, 480-1, 480-2 ... 480-P). That is, the communication paths 464, 476 can be a network relationship. Examples of such a network relationship can include a local area network (LAN), wide area network (WAN), personal area network (PAN), and the Internet, among others.

In such examples, the CRM 460 can be associated with a first computing device and the processing resources 468-1, 468-2 ... 468-N can be associated with a third computing device 466 (e.g., a Java® server, etc.). The CRM 472 can be associated with a second computing device and the processing resources 480-1, 480-2 ... 480-P can be associated with a fourth computing device 478. For example, a processing resource 468-1, 468-2 ... 468-N can be in communication with a CRM 460 wherein the CRM 460 includes a set of instructions and wherein the processing resource 468-1, 468-2 ... 468-N is designed to carry out the set of instructions to receive a GPS signal including position data from a first receiver.

The processing resources 468-1, 468-2 ... 468-N coupled to the memory resource 470 of the first computing device 430 can receive a GPS signal including position data using and/or from a first receiver, convert the GPS signal to a short range signal including the position data, and transmit the short range signal using a first transmitter. For instance, the short range signal 440 can be transmitted to the second computing device 448. The first computing device 430 can include a computing component of a first device, such as a fixed device. For example, the first computing device 430 can be mounted and/or fixed to a location, such as vehicle and/or building.

The processing resources 480-1, 480-2 ... 480-P coupled to the memory resource 482 of the second computing device 448 can receive the short range signal 440 using and/or from a second receiver, determine a position of the second device using the position data received in the short range signal 440, and transmit the determined position using a second transmitter. The second computing device 448 can include a computing component of the second device (e.g., a mobile device).

In accordance with some embodiments of the present disclosure, the second device, including the second computing device 448 as a component, can include an IMU. The second computing device 448 can, for example, communicate and/or send the position data and/or determined position to the IMU. The IMU can update the position and/or determine a revised position of the second device in response to receiving the position data and/or determined position. For instance, the IMU can update the position and/or determine a revised position and communicate and/or send the updated position and/or revised position to the second computing device 448. The second computing device 448 can transmit the updated and/or revised position using the second transmitter in response to receiving the updated and/or revised position from the IMU.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for transmitting a position of a device, comprising:
converting a received Global Positioning System (GPS) signal to a short range signal with a first device;
transmitting the short range signal using the first device;
receiving the short range signal with a second device;
transmitting position data of the second device using the short range signal of the second device.

2. The method of claim 1, wherein the first device includes a fixed device.

3. The method of claim 1, wherein the second device includes a mobile device.

4. The method of claim 1, wherein the method includes receiving the GPS signal using a GPS receiver of the first device.

5. The method of claim 1, wherein the method includes determining a position of the second device with the short range signal using the second device.

6. The method of claim 1, wherein the method includes:
receiving a plurality of short range signals with the second device; and
determining a position of the second device from the plurality of short range signals.

7. A system for transmitting a position of a device, comprising:
a first computing device including non-transitory computer-readable medium storing a set of instructions executable by a processor to cause the first computing device to:
receive a Global Positioning System (GPS) signal including position data from a first receiver;
convert the GPS signal to a short range signal including position data; and
transmit the short range signal using a first transmitter; and
a second computing device including non-transitory computer-readable medium storing a set of instructions executable by a processor to cause the second computing device to:
receive the short range signal from a second receiver;
determine a position of the second device using position data received in the short range signal; and
transmit the determined position using a second transmitter.

8. The system of claim 7, wherein the first computing device is mounted to at least one of a vehicle and a building.

9. The system of claim 7, wherein the second computing device includes instructions executable by the processor to cause the second computing device to transmit a revised position of the second device using the second transmitter in response to receiving the revised position from an inertial measurement unit of the second device.

10. The system of claim 7, wherein the first computing device includes a microcontroller embedded on the first device.

11. The system of claim 7, wherein the second computing device includes a microcontroller embedded on the second device.

12. A system for transmitting a position of a device, comprising:
a fixed device, comprising:
a GPS radio component including a GPS antenna and a GPS receiver for receiving a GPS signal including position data;
a first computing component for converting the GPS signal to a short range signal; and
a first short range radio component including a short range antenna and a short range transmitter for transmitting the converted short range signal; and
a mobile device, comprising:
a second short range radio component including a short range antenna and a short range receiver for receiving the converted short range signal;
a second computing component for determining a position of the mobile device using the position data in the converted short range signal;
an inertial measurement unit for determining a revised position of the mobile device using the determined position from the second computing component; and
a position reporting radio component including a position reporting transmitter and a position reporting antenna for transmitting the determined revised position of the mobile device.

13. The system of claim 12, wherein the system includes a plurality of fixed devices in the system, wherein the fixed device is among the plurality of fixed devices.

14. The system of claim 12, wherein the second computing component can determine the position of the mobile device based on a plurality of position data.

15. The system of claim 12, wherein the GPS radio component, the first computing component, and the short range transmitter of the first short range radio component of the fixed device are located on an outer portion of a location.

16. The system of claim 12, wherein the short range antenna of the fixed device is located on an inner portion of a location.

17. The system of claim 12, wherein the system includes an aperture to connect the short range transmitter to the short range antenna.

18. The system of claim 17, wherein an aperture includes a barrel extending from an outer portion of a location to an inner portion of the location.

19. The system of claim 12, wherein the mobile device includes at least one of a mobile cellular telephone and a navigation system.

20. The system of claim 12, wherein the mobile device includes a GPS radio component including a GPS antenna and a GPS receiver.

* * * * *